H. G. BROTT.
PACKAGE CARRIER FOR BICYCLES AND THE LIKE.
APPLICATION FILED JUNE 15, 1909.
965,436.
Patented July 26, 1910.
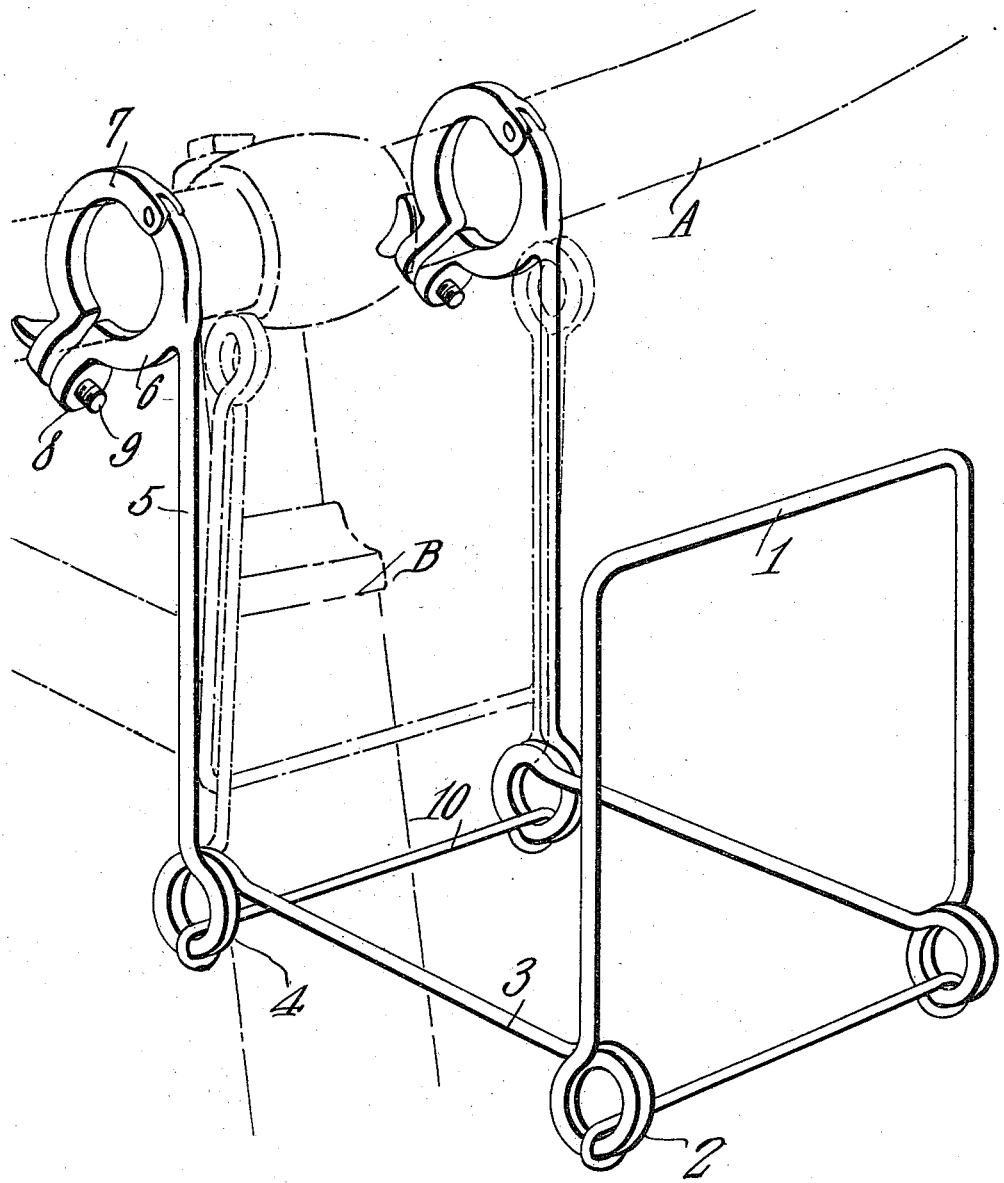
Howard G. Brott, Inventor
Witnesses

UNITED STATES PATENT OFFICE.

HOWARD G. BROTT, OF SAN JOSE, CALIFORNIA, ASSIGNOR, BY DIRECT AND MESNE ASSIGNMENTS, TO THE L-B MANUFACTURING CO., OF SAN JOSE, CALIFORNIA, A CORPORATION OF CALIFORNIA.

PACKAGE-CARRIER FOR BICYCLES AND THE LIKE.

965,436.     Specification of Letters Patent.     Patented July 26, 1910.

Application filed June 15, 1909. Serial No. 502,352.

*To all whom it may concern:*

Be it known that I, HOWARD G. BROTT, a citizen of the United States, residing at San Jose, in the county of Santa Clara and State of California, have invented a new and useful Package-Carrier for Bicycles and the Like, of which the following is a specification.

This invention relates to package carriers for use upon bicycles and the like and its object is to provide a simple, durable and inexpensive device of this character which can be readily placed in position upon a bicycle or the like and which normally occupies a comparatively small space, the construction of the device being such that the same will bind automatically upon any package placed therein and thus obviate the necessity of utilizing straps or similar fastening devices.

Another object is to provide a carrier which will fold automatically when not in use.

With these and other objects in view the invention consists of certain novel details of construction and combinations of parts hereinafter more fully described and pointed out in the claim.

In the accompanying drawing, which is a perspective view of the device, the preferred form of the invention has been shown.

Referring to the drawing by characters of reference 1 designates a bail-like clamping member merging into coils 2, from which extend intermediate arms 3, these arms also merging into coils 4 from which extend hangers 5. The hangers, coils, arms and bail member are all formed in a single length of spring wire of sufficient strength to support packages, baskets, boxes and the like, such as might be carried upon a bicycle, and the various portions are so formed that the coils will hold the bail member 1 normally pressed against the arms 3 and also pressed against the hangers 5, as indicated by dotted lines in the drawing. Arcuate clamping members 6 are formed at the upper ends of the hangers 5 and have pivoted clamping members 7 connected to them, the two members of each clamp being provided with ears 8 for the reception of a tightening screw 9.

Tie-wires 10 are loosely secured at their ends to the eyes 2 and 4 and serve to prevent the arms 3 from moving apart.

As heretofore pointed out the carrier herein described is normally folded as indicated by dotted lines. When it is desired to use the same the clamping members 7 are unfastened and swung upwardly so as to permit the handle-bar A of a bicycle to be placed between the two clamping members 6 and 7. The screws 9 are then tightened so as to bind the members upon the handle-bar and support the hangers 5 at opposite sides of the head B of the bicycle. The carrier is then unfolded so as to cause the parts to assume the positions indicated in full lines, and the bundle, box, basket or the like to be supported thereby is then placed upon the arms 3 and between the hangers 5 and bail 1, and as soon as the bail is released it will swing inwardly against the object upon the carrier and tightly clamp it against the hangers. Said object will thus be securely held without the necessity of utilizing straps or the like.

The device herein described is especially useful in holding lunch-boxes and baskets, although it can of course be employed for supporting various other objects. It is very light and durable in construction, cheap to manufacture and can be readily applied, one important feature being the fact that it automatically closes and assumes a folded position close to the head of the bicycle when not in use, it thus being held out of the way. Importance is also attached to the fact that it constantly exerts a binding action upon the object inserted into the holder and this obviates the necessity of utilizing separate securing devices.

Obviously various changes may be made in the construction and arrangement of the parts without departing from the spirit or sacrificing the advantages of the invention.

What is claimed is:—

A device of the class described including support engaging devices, and a single length of spring wire merging at its ends into the respective devices, said wire being bent to form parallel hangers having coils at their lower ends from which extend parallel arms merging into coils located at the lower end of a bail shaped clamping member, said member being normally folded upon the arms and against the hangers, transversely extending tie wires engaging the coils for holding the ends of the arms properly spaced apart, the bail shaped portion, when the device is folded, being located between the arms and the hangers and in contact therewith.

In testimony that I claim the foregoing as my own, I have hereto affixed my signature in the presence of two witnesses.

HOWARD G. BROTT.

Witnesses:
 HARRY A. LOOMIS,
 ZELDA C. ESTABROOK.